2 Sheets—Sheet 1.

T. MEIKLE.
Sulky-Plow.

No. 209,283. Patented Oct. 22, 1878.

Witnesses.
A. Ruppert,
J. G. Mason.

Inventor:
Thomas Meikle
D. P. Holloway & Co
Att'ys

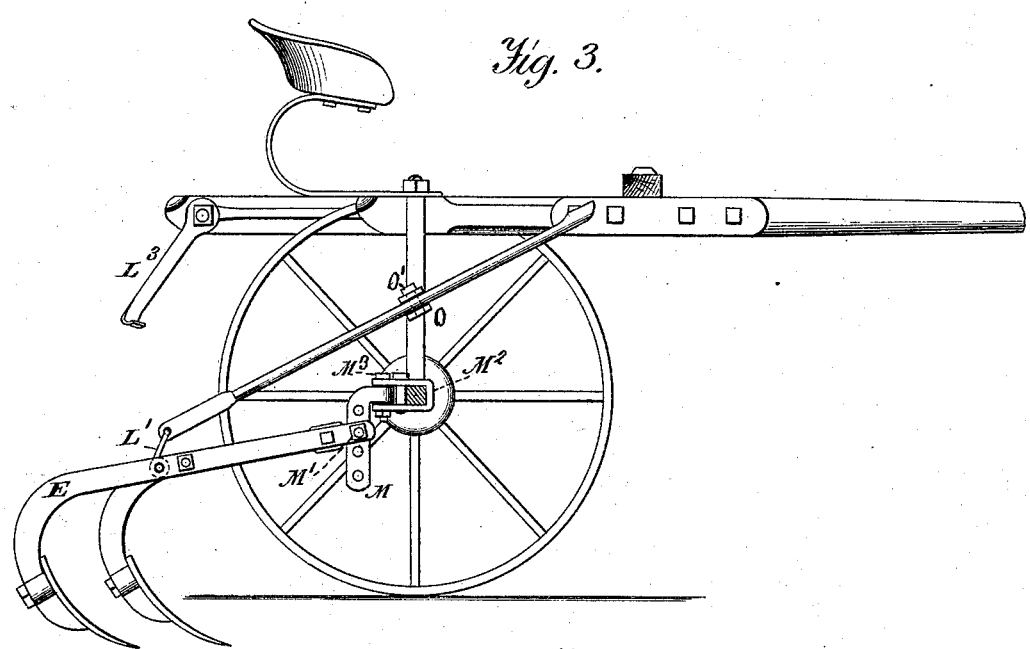
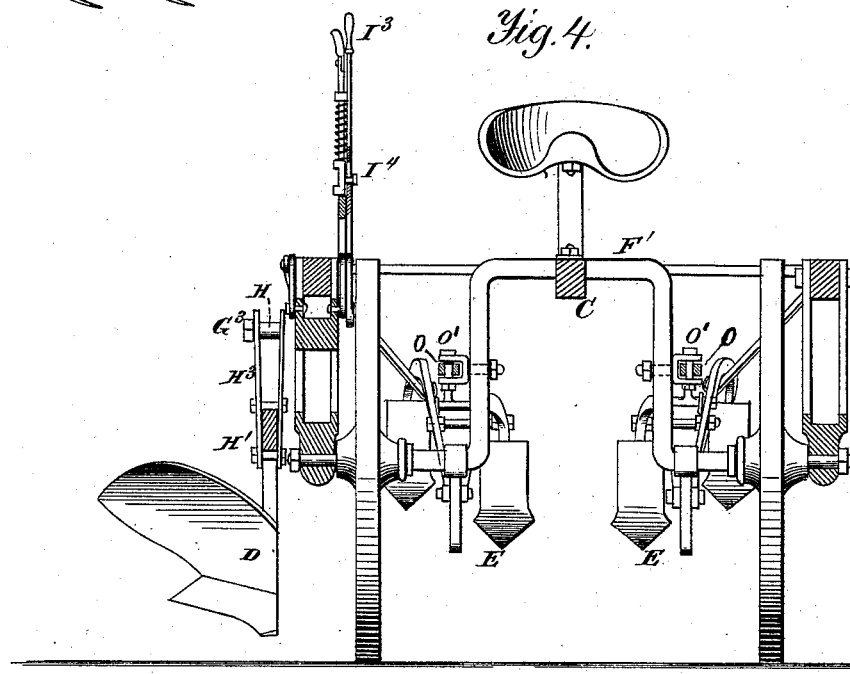

UNITED STATES PATENT OFFICE.

THOMAS MEIKLE, OF LOUISVILLE, KENTUCKY.

IMPROVEMENT IN SULKY-PLOWS.

Specification forming part of Letters Patent No. 209,283, dated October 22, 1878; application filed August 31, 1878.

*To all whom it may concern:*

Be it known that I, THOMAS MEIKLE, of Louisville, in the county of Jefferson and State of Kentucky, have invented certain new and useful Improvements in Carriage or Sulky Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to sulky-plows constructed and arranged to admit of being readily changed to a carriage-cultivator; and it consists in the combination, with a U-shaped grooved standard attached to the frame and extended axle-spindle, of a sliding box whose tongue is received in the groove of said standard and the plow attached outside of the wheels.

Figure 1:
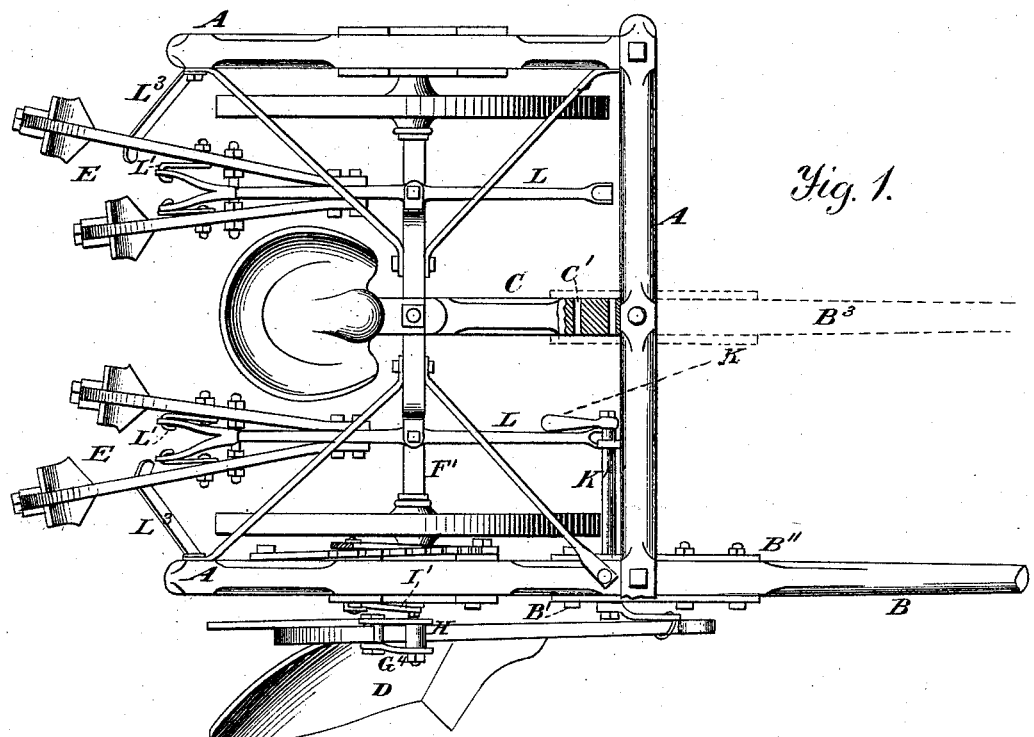
Figure 2:
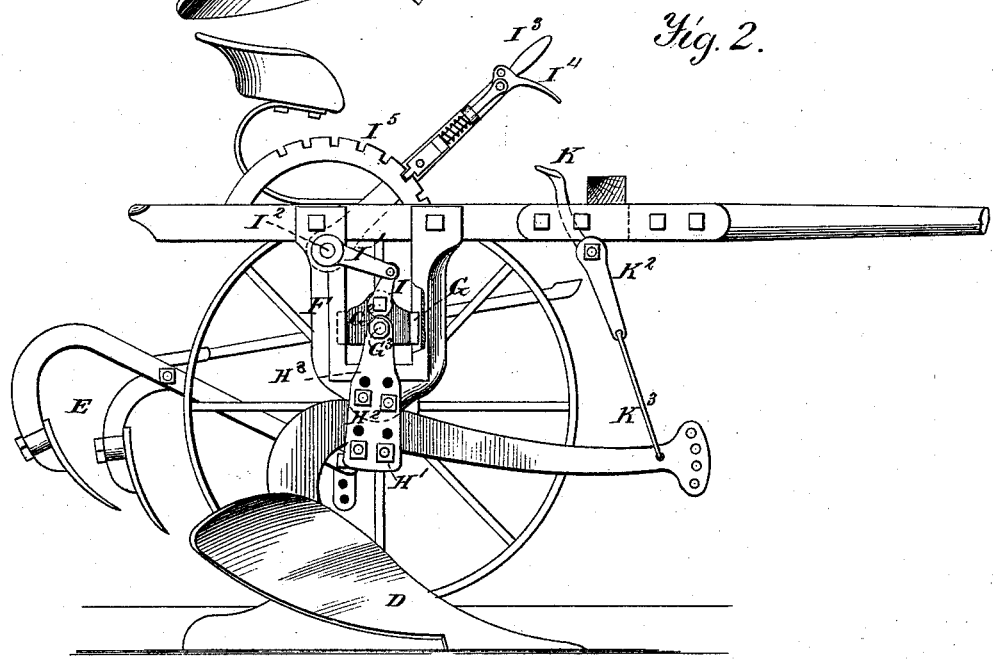

In the annexed drawings, Figure 1 is a plan view, exhibiting both the cultivator and plow attachments in connection with the carriage-frame. Fig. 2 is an elevation of the same. Fig. 3 is a sectional elevation. Fig. 4 is a vertical transverse section.

The same letters indicate like parts in all the figures.

A A A is the frame of the carriage. B is the draft-tongue of the carriage. C is the center-piece of the frame, which is provided with the holes C′ to receive the bolts B¹, passing through the straps B², by means of which the tongue B can be readily placed in position indicated by the dotted lines B³ when it is desired to change the purposes of the carriage-plow by adapting it to the purposes of a carriage-cultivator.

The draft-tongue B, being in position indicated at B, provides a direct draft for the plow D, and when changed to the center-piece C it provides a center-draft for the cultivators E E.

F is a U-shaped standard attached to the extended spindle of the axle F′ and to the frame A, and constructed with a vertical groove in its inner edges for the purpose of receiving the tongue G of the sliding box G² and holding the sliding box G² in position. Into this sliding box G² is inserted the stud G³, to which is attached the adjustable stirrup G⁴, so constructed with the sleeve H, the bolts H¹, and holes H², and straps H³ as to provide such adjustment that plows of different patterns and sizes may be attached thereto for use.

By means of the link I, the crank I¹, the lever I³, the shaft I², and the dog I⁴, with the segment notched bar I⁵, the position of the plow above the ground or the depth of furrow is determined and maintained.

By means of the foot-lever K, the shaft K¹, the crank K², and the link K³, (as attached to the plow-beam,) in connection with the pivoted stirrup upon the stud G³, the position of the point of the plow is subject to the control of the operator.

When desiring to use the cultivator only, the plow is suspended by means of lever I³, or it may be detached by removing the stirrup G⁴ and link K³, and the draft-tongue is placed in position on the center-piece C. The foot-levers L and universal fulcrums O and link L¹ are employed to control the direction of the cultivators and raise and lower the same, and the hooks L³ to hold the cultivators in suspended position when not in use.

The angled draw-bar M, provided with a series of holes for the insertion of the draw-bolt M¹ of the cultivator—said draw-bar being attached to the axle by means of the hasp M² and bolt M³—provides a flexible draft, and allows an oscillatory movement to the cultivators when in use, thereby allowing the several blades of the cultivator to accommodate themselves automatically to any obstruction by a lateral motion. When the carriage is being used for the purposes of a carriage-plow, the cultivator attachments may be detached by removing the four bolts M¹ M¹ and O′ O′.

What I claim, and desire to secure by Letters Patent, is—

In combination, the U-shaped grooved standard F and the sliding box G², with the plow D, attached outside of the wheel, as and for the purposes substantially as described.

In testimony that I claim the foregoing as my own I affix my signature in presence of two witnesses.

THOMAS MEIKLE.

Witnesses:
J. SPEED PEAY,
W. H. WATTS.